US008691425B2

(12) United States Patent
Yoon

(10) Patent No.: US 8,691,425 B2
(45) Date of Patent: Apr. 8, 2014

(54) POLYMER BATTERY PACK AND MANUFACTURING METHOD OF THE SAME

(75) Inventor: Heuisang Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 733 days.

(21) Appl. No.: 11/408,010

(22) Filed: Apr. 21, 2006

(65) Prior Publication Data

US 2006/0257731 A1 Nov. 16, 2006

(30) Foreign Application Priority Data

Apr. 26, 2005 (KR) .................. 10-2005-0034724

(51) Int. Cl.
*H01M 2/02* (2006.01)
(52) U.S. Cl.
USPC .......................................... 429/176; 429/177
(58) Field of Classification Search
USPC ...................................... 429/7, 176, 177, 175
See application file for complete search history.

(56) References Cited

U.S. PATENT DOCUMENTS

| 6,225,778 | B1 * | 5/2001 | Hayama et al. | 320/112 |
|---|---|---|---|---|
| 6,368,744 | B1 | 4/2002 | Hatazawa et al. | |
| 6,451,474 | B1 * | 9/2002 | Kozu et al. | 429/100 |
| 6,492,058 | B1 * | 12/2002 | Watanabe et al. | 429/121 |
| 6,808,844 | B2 * | 10/2004 | Ehara | 429/175 |
| 6,881,311 | B2 | 4/2005 | Kadokura et al. | |
| 6,881,516 | B2 * | 4/2005 | Aamodt et al. | 429/181 |
| 6,893,753 | B2 | 5/2005 | Iwaizono et al. | |
| 2002/0142195 | A1 | 10/2002 | Ehara | |
| 2003/0141841 | A1 * | 7/2003 | Kawabata et al. | 320/112 |
| 2003/0165736 | A1 * | 9/2003 | Hiratsuka | 429/153 |
| 2003/0173709 | A1 * | 9/2003 | Iwaizono et al. | 264/272.17 |
| 2004/0081887 | A1 * | 4/2004 | Sugiyama et al. | 429/162 |
| 2005/0037259 | A1 * | 2/2005 | Maruyama | 429/176 |
| 2005/0191546 | A1 * | 9/2005 | Jeon | 429/127 |

FOREIGN PATENT DOCUMENTS

| EP | 1 482 577 A1 | 12/2004 |
|---|---|---|
| JP | 2000-243364 A | 9/2000 |
| JP | 2001-035544 A | 2/2001 |
| JP | 2002-134077 | 5/2002 |
| JP | 2002-298828 | 10/2002 |
| JP | 2003-303580 | 10/2003 |
| KR | 10-2004-0015314 | 2/2004 |
| KR | 10 2005-0036630 A | 4/2005 |

OTHER PUBLICATIONS

Gokel, George W., Dean's Handbook of Organic Chemistry, McGraw-Hill, 2nd Edition, Interactive Table 10.2a No. 92. Online version available at: http://www.knovel.com/knovel2/Toc.jsp?, BookID=1158&VerticalID=0.*
Dean's Handbook of Organic Chemistry, retrieved Jan. 10, 2008.*

* cited by examiner

*Primary Examiner* — Ula C Ruddock
*Assistant Examiner* — Lisa S Park Gehrke
(74) *Attorney, Agent, or Firm* — Christie, Parker & Hale, LLP

(57) ABSTRACT

A polymer battery pack and a manufacturing method thereof. A polymer battery pack includes a core pack formed by attaching a protection circuit member to a bare cell, a case combining with the core pack and exposing the protection circuit member externally, and a resin wrapping the protection circuit board exposed through the case is provided. Strength and reliability of the polymer battery pack is improved by using the case, the bottom cover, and the resin having high strength, and the polymer battery pack can accommodate the core pack of high capacity, since no additional space is required for ultrasonic welding.

19 Claims, 20 Drawing Sheets

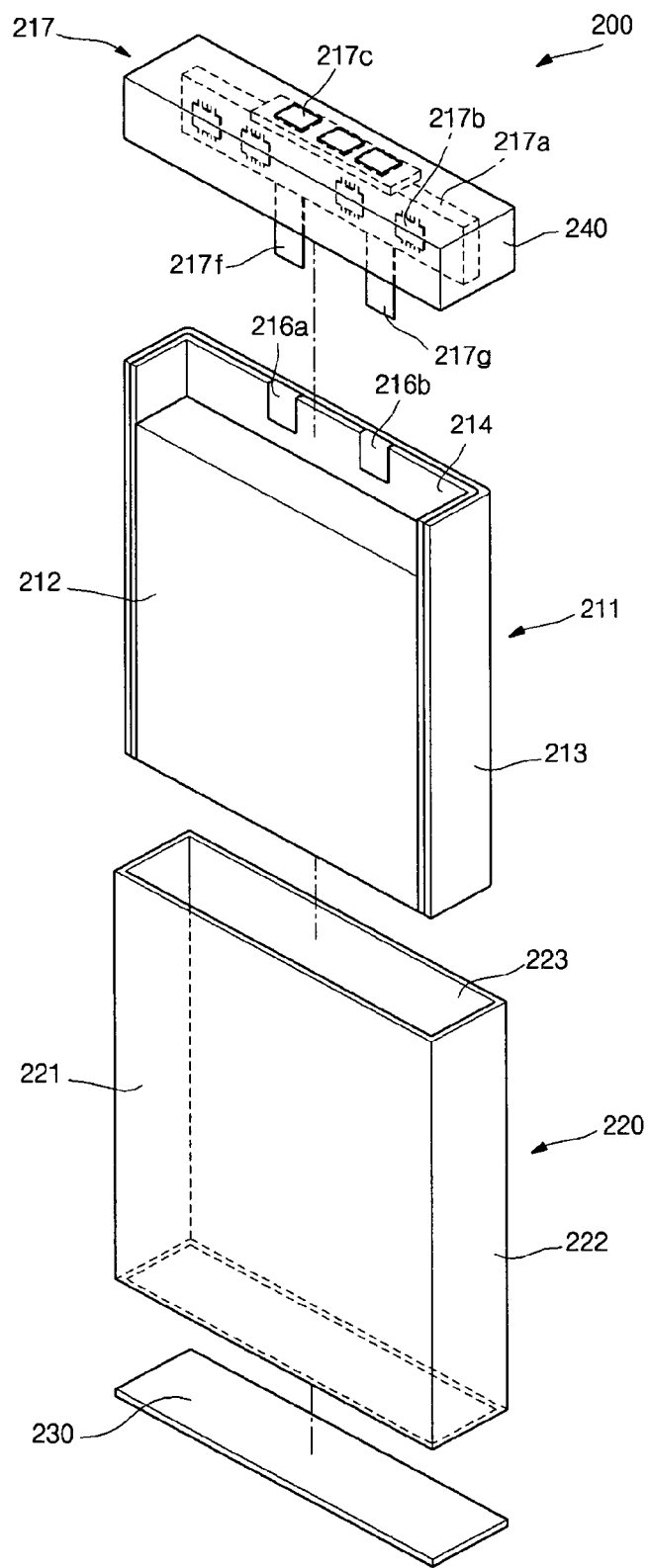

POLYMER BATTERY PACK AND MANUFACTURING METHOD OF THE SAME

CROSS-REFERENCE TO RELATED APPLICATIONS

This application claims the benefit of Korean Patent Application No. 2005-34724, filed Apr. 26, 2005, in the Korean Intellectual Property Office, the entire content of which is incorporated herein by reference.

BACKGROUND OF THE INVENTION

1. Field of the Invention

Aspects of the present invention relate to a polymer battery pack and, more particularly, to a polymer battery pack capable of improving external strength and increasing capacity and a manufacturing method of the polymer battery pack.

2. Description of the Related Art

Generally, a polymer battery pack includes a core pack which is a protection circuit member connected to a bare cell having a form of a pouch and a plastic case in which the core pack is inserted and of which all seams are ultrasonically welded. Here, the bare cell having the form of the pouch is a lithium polymer battery having a structure in which an electrode assembly including a cathode, a separator, an anode, and polymer electrolyte is accommodated into the pouch made of cast polypropylene (CPP), aluminum, nylon, or polyethylene terephthalate (PET). The polymer battery pack or a lithium polymer battery is so named to differentiate it from a lithium ion battery pack or a lithium ion battery which uses a liquid electrolyte.

However, the lithium polymer battery pack may be easily damaged by external forces to decrease reliability of the battery pack, since the pouch constituting the bare cell and a plastic case wrapping the pouch are weak. In other words, aluminum used for the pouch is in a form of a foil and the plastic case wrapping the pouch is thin, so that the pouch and the plastic case may be easily deformed and easily pierced by a sharp instrument such as a nail or a needle. When the polymer battery pack is deformed or pierced by a sharp instrument, a smoke, a flame, or an explosion may occur due to an internal short.

In addition, along seams of the plastic case in the polymer battery pack, a rib space is required for ultrasonic welding the plastic case, and the space occupies at least 0.8 mm or more. Accordingly, a size of the core pack, which is the bare cell, inserted into the polymer battery pack is decreased, and this results in a decrease in the capacity of the battery pack. In other words, the size of the core pack which can be inserted into the plastic case is comparatively very small compared to the size of the plastic case, so that the core pack of high capacity cannot be inserted into the plastic case. In practice, a conventional polymer battery pack cannot accommodate the core pack of approximately 680 mAh capacity or more.

SUMMARY OF THE INVENTION

Aspects of the present invention provide a polymer battery pack capable of improving external strength and increasing capacity and a manufacturing method of the polymer battery pack.

According to an aspect of the present invention, there is provided a manufacturing method of a polymer battery pack comprising: forming a bare cell by inserting an electrode assembly into a pouch and sealing the pouch; forming a core pack by connecting a protection circuit member having at least one electrode terminal to an outer surface of the bare cell; combining the core pack into the case to expose the protection circuit member and a bottom surface in the opposite direction to the protection circuit member; attaching a bottom cover to cover the bottom surface of the core pack exposed through the case; and molding the protection circuit member exposed through the case with resin to expose externally the electrode terminal of the protection circuit member.

As described above, the polymer battery pack and the manufacturing method thereof according to the present invention improves strength and reliability of the polymer battery pack by wrapping the bare cell having a form of a pouch which is weak with a case having high strength and molding the protection circuit member with the resin.

In addition, according to an aspect of the present invention, a thickness of the case can be reduced to 0.1 to 0.2 mm, so that the capacity of the battery can be increased remarkably. In other words, while in a case of a conventional polymer battery pack, a space of approximate 0.8 mm is required for ultrasonic welding, according to aspects of the present invention, the space for ultrasonic welding is not required and accordingly, it is possible to include a bare cell or a core pack having a capacity of 850 mAh or more.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is an exploded perspective view of the polymer battery pack in FIG. 6;

DETAILED DESCRIPTION OF THE EMBODIMENTS

Figure 1:
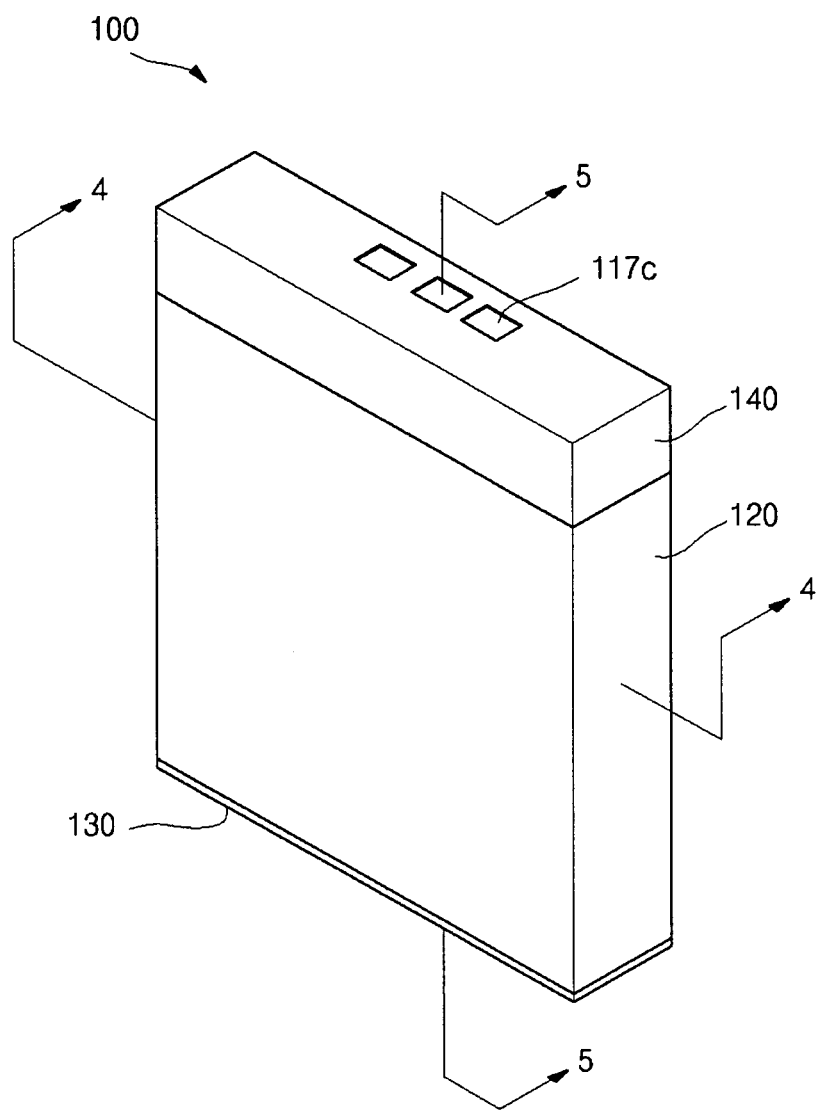
FIG. 1 is a perspective view of a polymer battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a perspective view of a polymer battery pack according to an embodiment of the present invention. As illustrated in FIG. 1, the polymer battery pack 100 in the embodiment includes a case 120 having high strength, a bottom cover 130 covering a bottom of the case 120, and a resin 140 molded into an upper part of the case 120 as is recognized from an appearance of the polymer battery pack 100. Here, the case 120 is formed as a substantially rectangular parallelepiped shape, and the resin 140 is formed as a substantially rectangular parallelepiped shape, too. One or more electrode terminals 117c are exposed externally. Although the terms upper and bottom are used throughout the specification to describe the relative position of elements, such as the relation of opposite ends of the polymer battery pack 100 shown in FIG. 1, it is understood that this description of upper and bottom is for convenience and as such these designations should not be construed to limit an orientation of a device. Similarly, terms such as height and width are used to refer to sizes of elements in a same direction and should not be construed to limit the orientation of the device.

Figure 2:
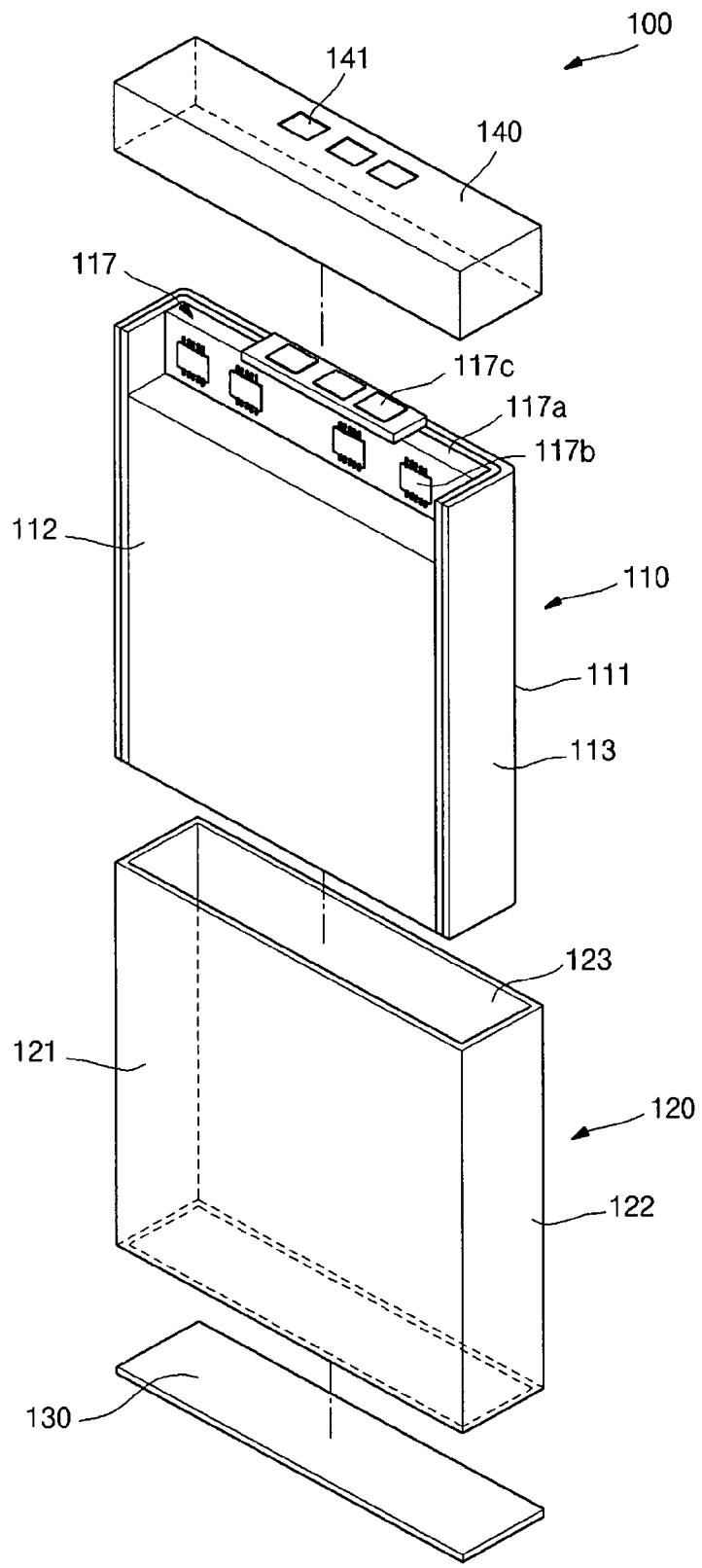
FIG. 2 is an exploded perspective view of the polymer battery pack in FIG. 1.

FIG. 2 is an exploded perspective view of the polymer battery pack 100 in FIG. 1 As illustrated in FIG. 2, the polymer battery pack 100 in the present embodiment includes a core pack 110 having a structure in which a protection circuit member 117 is attached to a bare cell 111, a case 120 into which the core pack 110 is combined to expose externally the protection circuit member 117 and a bottom surface which is in an opposite direction to the protection circuit member 117, a bottom cover 130 which covers the bottom surface exposed through the case 120, and a resin which wraps the protection circuit member 117 exposed through the case 120.

The bare cell 111 included in the core pack 110 may be a conventional lithium polymer battery. In the bare cell 111, a pouch 112 forms an external appearance, and three surfaces of the pouch 112 except a surface of a lower part are heat-welded with one another. In addition, two surfaces facing each other among the three surfaces of the pouch 112 are folded to minimize a size of the pouch 112. Here, the folded parts of the pouch 112 are defined as folded parts 113. In an upper space between the folded parts 113, the protection circuit member 117 is seated. The protection circuit member 117 includes a printed circuit board 117a, one or more electronic parts 117b installed on the printed circuit board 117a, and one or more electrode terminals 117c installed on the printed circuit board 117a.

The case 120 is in a form of a tube or a sleeve of which a surface in a direction to the protection circuit member 117 and a surface in an opposite direction to the protection circuit member 117, that is a bottom surface, are open. More specifically, the case 120 includes two long-sided parts 121 which each have a comparatively large area and are separated from each other by a predetermined distance. In addition, the case 120 includes two short-sided parts 122 which connect both ends of the long-sided parts 121 and each have a comparatively small area. The case 120 has openings 123 which are open in upward and downward directions by the long-sided and short-sided parts 121 and 122. The case 120 including the long-sided and short-sided parts 121 and 122 may be formed by injection molding of polyamid, polyurethane, plastic, fiber-reinforced plastic, engineering plastic or the equivalents. In addition, the case 120 may be formed by deep-drawing a metal master into one body or welding two metal masters together. Moreover, the case 120 may be formed from one of aluminum-based, magnesium-based, steel-based, stainless steel-based metals and the equivalents which can be deep-drawn and are lightweight and have a high strength.

The case 120 may be formed to have a thickness of approximately 0.1~0.2 mm to include the core pack 110 having a high capacity of 850 mAh or more. In other words, while a rib space of approximate 0.8 mm, that is 0.4 mm for each side, is required in a conventional battery pack, whereas, in the embodiment of the present invention, space for ultrasonic welding is not required, so that the core pack 110 having a larger size than a size of the core pack in a conventional polymer battery pack can be included. When the thickness of the case 120 is 0.1 mm or less, required strength cannot be obtained, while when the thickness of the case 120 is 0.2 mm or more, the case would be too thick and heavy, although the strength required can be obtained. A total height of the case 120 may be less than that of the core pack 110. In other words, when the case 120 is combined with the core pack 110, the protection circuit member 117 and some area of the core pack 110 neighboring the protection circuit member 117 are exposed externally and protruded to a predetermined length through the case 120. In addition, a bottom surface of the core pack 110 is also exposed externally through a lower part of the case 120.

In addition, the bottom cover 130 is attached to the lower part of the case 120, so that the core pack 110 cannot be moved away through the lower part of the case 120. The bottom cover 130 is attached to a lower part of the long-sided and short-sided parts 121 and 122 of the case 120 by a conventional adhesive or welding. The bottom cover 130 may be formed from one of polyamid, polyurethane, plastic, fiber-reinforced plastic, engineering plastic, aluminum-based, magnesium-based, steel-based, stainless steel-based metals and the equivalents. However, material of the bottom cover 130 is not limited thereto. The bottom cover 130 may be formed to have a thickness of approximately 0.1~0.2 mm. When the thickness of the bottom cover 130 is 0.1 mm or less, a required strength cannot be obtained, while when the thickness of the bottom case 130 is 0.2 mm or more, the case would generally be too thick and heavy, although the strength required would be obtained.

Thereafter, the resin 140 covers the protection circuit member 117 which is installed to an opposite side, that is an upper part, to the bottom cover 130 and some areas of the core pack 110 neighboring the protection circuit member 117. The electrode terminal 117c of the protection circuit member 117 which is connected to an external apparatus is exposed externally through an opening 141 of the resin 140. The resin 140 may be a hot melt resin or the equivalent which melts at a temperature of about 140~160° C. However, material of the resin 140 is not limited thereto, for example, the resin could be an epoxy that cures at room temperature. Although the resin 140 is illustrated as a separate component from the protection circuit member 117 in FIG. 2, in practice, the resin is formed in a metal mold (not shown) by a molding process. In other words, the core pack 110 is combined into the case 120, and the combined case is disposed in the metal mold, and the resin 140 is formed as a substantially rectangular parallelepiped shape as illustrated in FIG. 2 by filling and hardening the resin 140 having a high temperature and a high pressure into the protection circuit member 117 and some areas of the core pack 110 neighboring the protection circuit member 117.

Figure 3:
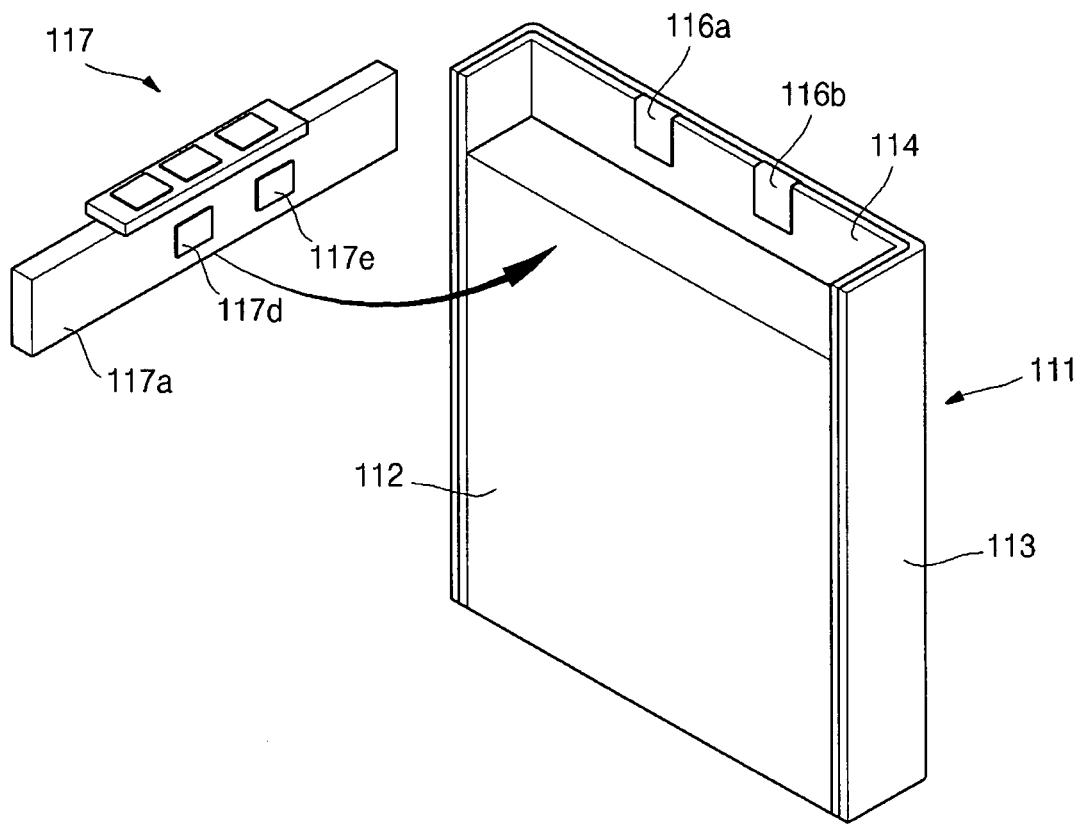
FIG. 3 is a perspective view of connection of a protection circuit member and a bare cell in the polymer battery pack in FIG. 1.

FIG. 3 is a perspective view of a connection of the protection circuit member 117 and the bare cell 111 in the polymer battery pack in FIG. 1. As illustrated in FIG. 3, conductive electrode tabs 116a and 116b are exposed and extended to a predetermined length into a sealed upper region 114 located upward from the pouch 112 of the bare cell 111. In addition, conductive pads 117d and 117e are formed on the printed circuit board 117a of the protection circuit member 117 for an electrical connection. Accordingly, the conductive pads 117d and 117e and the conductive electrode tabs 116a and 116b are mutually connected by ultrasonic welding, laser welding, resistance welding, soldering, etc. The protection circuit member 117 is stably seated in the sealed upper region 114 of the bare cell 111 by the connection.

Figure 4:
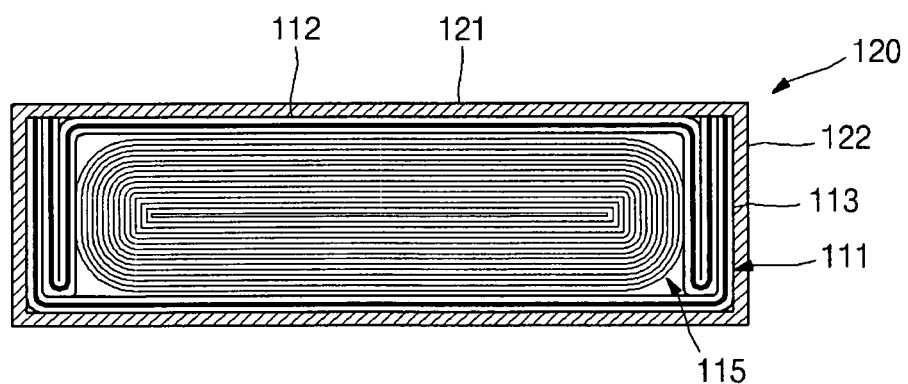
FIG. 4 is a sectional view of the polymer battery pack taken along section line 4-4 of FIG. 1.

FIG. 4 is a sectional view of the polymer battery pack 100 taken along section line 4-4 of FIG. 1. As illustrated in FIG. 4, inside the pouch 112 included in the bare cell 111, an electrode assembly 115 which has been wound multiple times is included. Detailed structures of the pouch 112 and the electrode assembly 115 will be described as below. The folded parts 113 formed on both sides of the pouch 112 facing each other are bent to a predetermined direction, so that an area occupied by the bare cell 111 can be minimized. In addition, outer surfaces of the pouch 112 are wrapped by the case 120. In other words, the case 120 including the long-sided and short-sided parts 121 and 120 wraps the outer surfaces of the pouch 112 completely. The external strength of the polymer battery pack, according to aspects of the present invention, is greatly improved by directly ensconcing the pouch 112 of the bare cell 111 having a low strength with the case 120 having a high strength. Moreover, since an additional space for ultrasonic welding is not required in the case 120, a comparatively large-sized bare cell 111 can be easily included, so that total capacity of the polymer battery pack 100 is increased.

Figure 5:
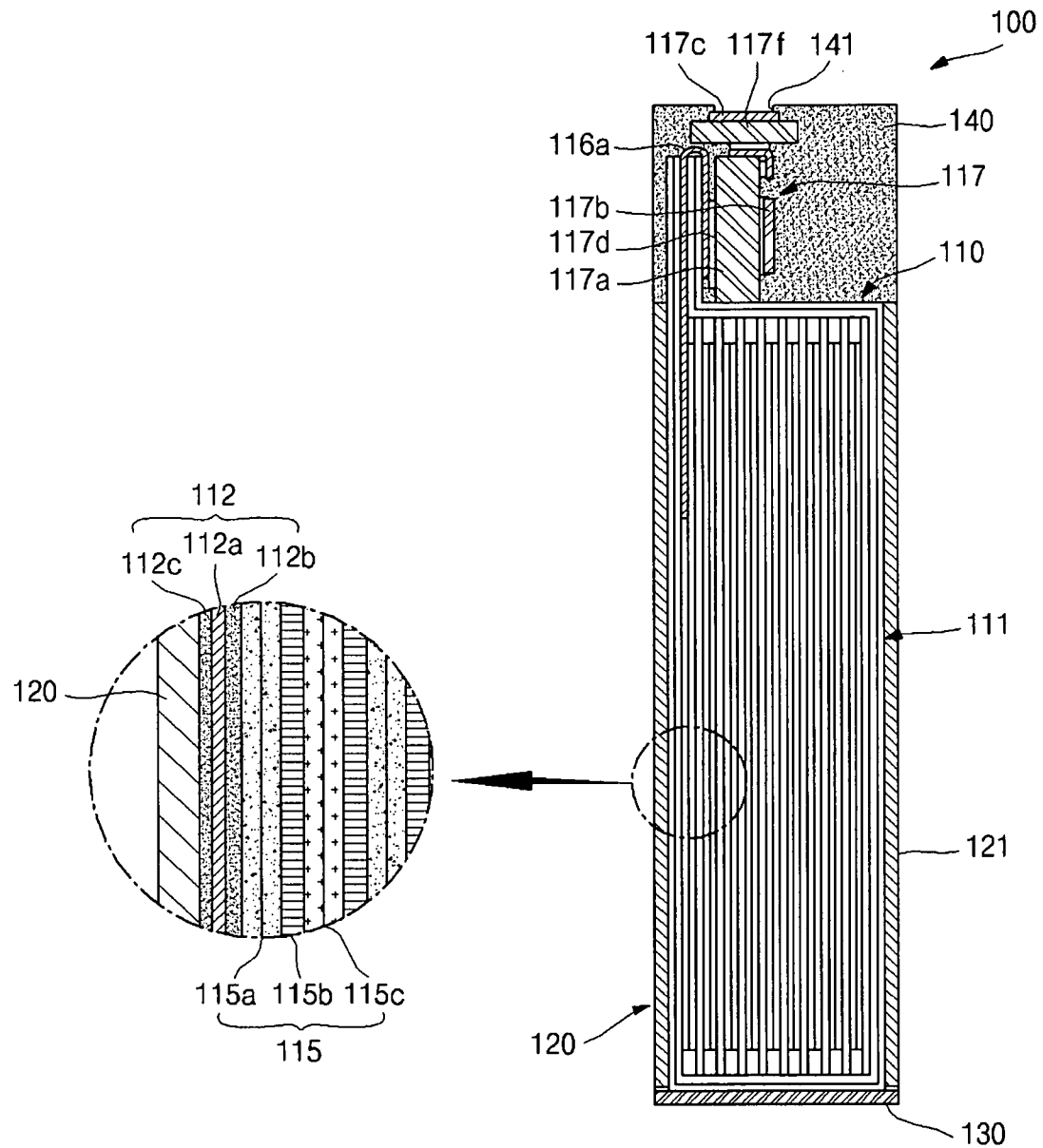
FIG. 5 is a sectional view of the polymer battery pack taken along section line 5-5 of FIG. 1.

FIG. 5 is a sectional view of the polymer battery pack 100 taken along section line 5-5 of FIG. 1. As illustrated in FIG. 5, the polymer battery pack 100 formed by being wrapped by the case 120, the bottom cover 130, and the resin (cover) 140 directly contacts and surrounds both the sealed upper region 114 of the bare cell 111 and the protection circuit member 117. The bare cell 111 and the protection circuit member 117 are together called the core pack 110. An outer surface of bare cell 111 is wrapped by the pouch 112. In the pouch 112, a metal layer 112a is disposed in the middle, and a first insulation layer 112b is formed on one side, and a second insulation layer 112c is formed on the other side. Here, the metal layer 112a may be formed from one of aluminum, steel, stainless steel, or the equivalent. However, materials of the metal layer 112a are not limited thereto. The first insulation layer 112b may be selected from one of cast polypropylene (CPP) and the equivalents, and the second insulation layer 112c may be selected from one of nylon, polyethylene terephthalate (PET), and the equivalents. However, materials of the first and second insulation layers 112b and 112c are not limited thereto.

Inside the pouch 112, an electrode assembly 115 is included. The electrode assembly 115 includes a first electrode 115a, a separator 115b, and a second electrode 115c. The electrode assembly 115 has a structure in which the components described above are wound multiple times. In the first electrode 115a, a first current collector is disposed in the middle and a first active material is coated on a surface of the first current collector. In the second electrode 115c, a second current collector is disposed in the middle and a second active material is coated on a surface of the second current collector. As an embodiment, the first electrode 115a may be an anode and the first current collector may be an aluminum foil and the first active material may be a lithium oxide. In addition, the second electrode 115c may be a cathode, and the second current collector may be a copper foil and the second active material may be a carbon based material. In addition, a first conductive electrode tab 116a is connected to the first current collector of the first electrode 115a and extended to a predetermined length outside the pouch 112, and a second conductive electrode tab 116b is connected to the second current collector of the second electrode 115c and extended to a predetermined length outside the pouch 112. In FIG. 5, only the first conductive electrode tab 116a of conductive electrode tabs 116a and 116b is shown. Between the first and second electrodes 115a and 115c, a separator 115b made of a macroporous material through which only lithium ions can pass is interposed.

In addition, the protection circuit member 117 is electrically connected to the conductive electrode tab 116a which is extended to a predetermined length outside the pouch 112. In other words, on the printed circuit board 117a included in the protection circuit member 117, a conductive pad 117d is formed. And the conductive pad 117d is electrically connected to the conductive electrode tab 116a. Although it is not shown in FIG. 5, another conductive pad 117e is connected to another conductive electrode tab 116b.

In addition, on an upper end of the printed circuit board 117a of the protection circuit member 117, an electrode terminal 117c is formed and the electrode terminal 117c is installed on an insulator 117f. The electrode terminal 117c and the printed circuit board 117a are electrically connected with each other. In addition, the electrode terminal 117c is exposed externally through an opening 141 formed in the resin 140.

Figure 6:
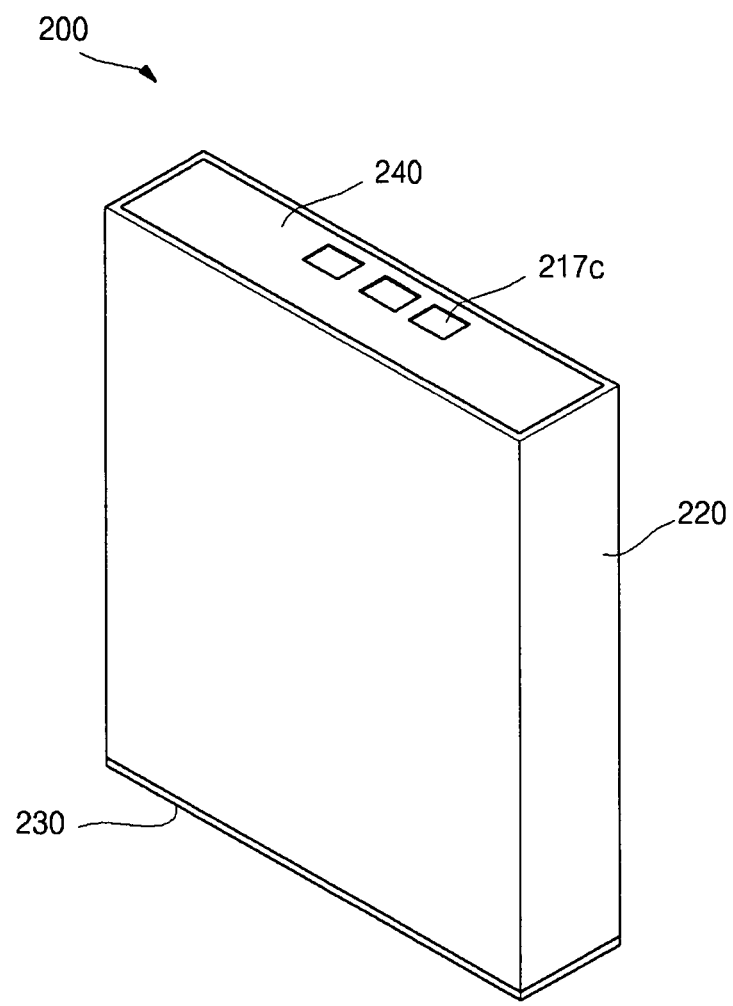
FIG. 6 is a perspective view of a polymer battery pack according to another embodiment of the present invention.

FIG. 6 is a perspective view of a polymer battery pack according to another embodiment of the present invention. As illustrated in FIG. 6, most external surfaces of the polymer battery pack 200 in the present embodiment are wrapped by a case 220 and a bottom cover 230. In other words, heights of the polymer pack 200 and the case 220 are almost the same. The polymer pack 200 has a structure in which a resin 240 is exposed externally through an upper part of the case 220, and an electrode terminal 217c is exposed through the resin 240. In other words, in the structure of the polymer battery pack 200 in the present embodiment, only an upper surface of the resin 240 is exposed, while in the polymer battery pack 100 illustrated in FIG. 1, surfaces of four sides are exposed together including the upper surface.

FIG. 7 is an exploded perspective view of the polymer battery pack in FIG. 6. As illustrated in FIG. 7, in the battery pack 200 according to the embodiment, the protection circuit member 217 which has been molded with the resin 240 in advance is combined with the case 220. In other words, components constituting the protection circuit member 217 such as a printed circuit board 217a and an electronic component 217b are molded with the resin 240 or the equivalent of the resin 240 in advance. At this time, other conductive electrode tabs 217f and 217g which are extended outside the resin 240 are formed. Further, the conductive electrode tabs 217f and 217g are electrically connected to conductive electrode tabs 216a and 216b formed on the bare cell 211. The polymer battery pack 200 further includes a second pouch 212, second folded parts 213, a second area 214 in which the protection circuit member 217 is stably seated, second long-sided parts 221, second short-sided parts 222, and second openings 223, which are open in upward and downward directions by the second long-sided and second short-sided parts 221 and 222.

A height of the bare cell 211 is a little less than that of the case 220. In other words, when the bare cell is combined into the case 220, a predetermined region of the bare cell 211 is exposed outside the case, but does not protrude. Accordingly, the polymer battery pack 200 is fully assembled by combining the protection circuit member 217 with an upper space of the case 220, while connecting conductive electrodes tabs 217f and 217g of the protection circuit member 217 which has been molded with the resin 240 to the conductive electrode tabs 216a and 216b of the bare cell 211 which has been completely combined with the case 220 and the bottom cover 230. The polymer battery pack 200 in the current embodiment has a structure in which the case 220 and the bottom cover 230, both of which have a high strength, wrap most of the outer surfaces of other components, so that strength and reliability of the polymer battery pack 200 is improved remarkably. In addition, a waterproof adhesive layer may be formed on a boundary between the molded resin 240 and the case 200, since a foreign substance or water may penetrate through a gap between the resin 240, which has molded the protection circuit board 217 in advance, and the case 220.

Figure 8A:
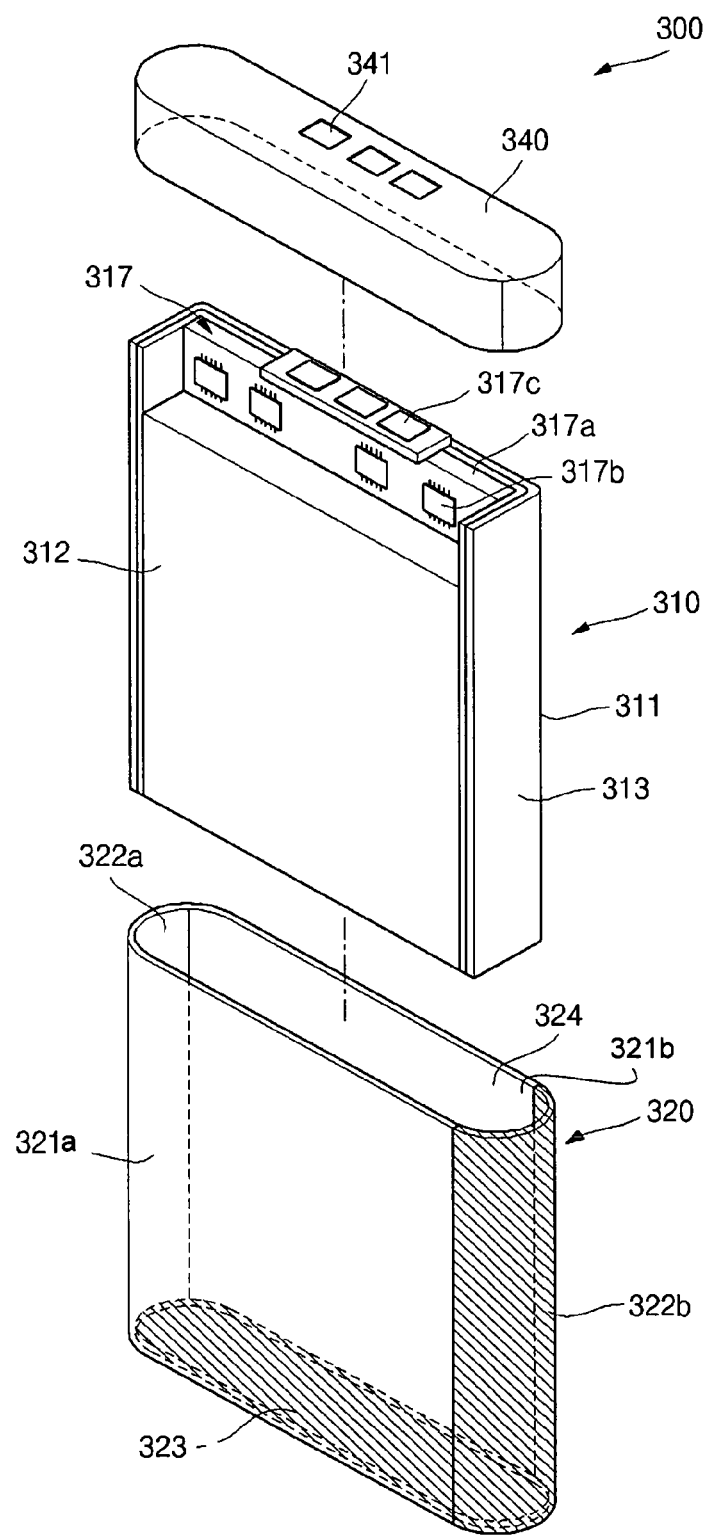
FIG. 8A is an exploded perspective view of a polymer battery pack according to another embodiment of the present invention.
Figure 8B:
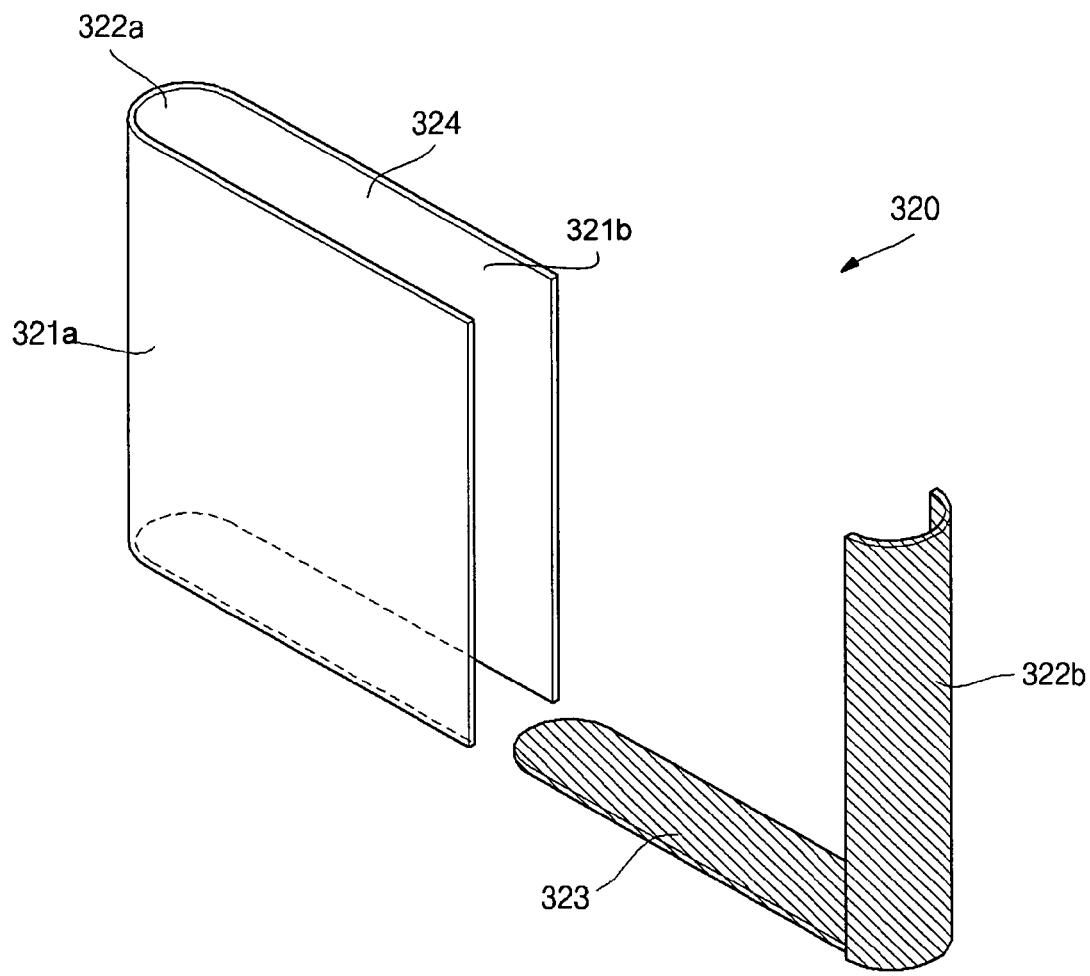
FIG. 8B is an exploded perspective view of a case in FIG. 8A.
Figure 8C:
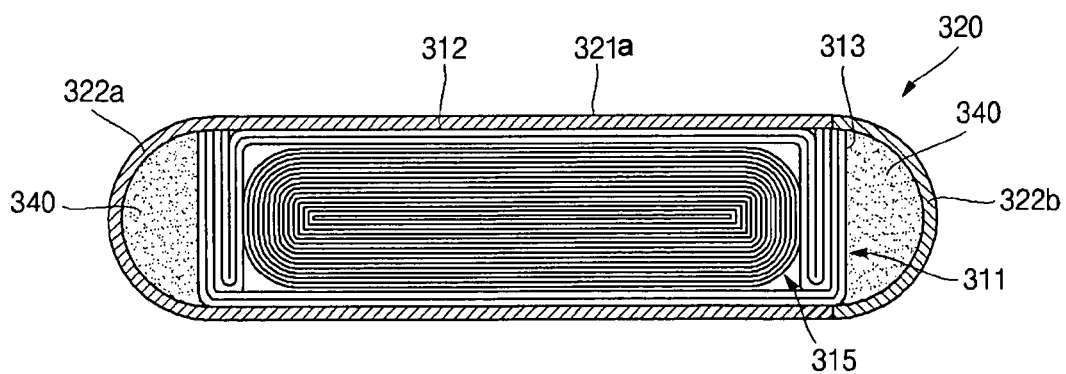
FIG. 8C is a sectional view of a connection of a bare cell and the case in FIG. 8A.

FIG. 8A is an exploded perspective view of a polymer battery pack according to another embodiment of the present invention. FIG. 8B is an exploded perspective view of a case in FIG. 8A, and FIG. 8C is a sectional view of a connection of a bare cell and a case.

As illustrated in FIGS. 8A and 8B, the case 320 of the polymer battery pack 300 according to the embodiment is different from the cases 120 and 220 of the polymer packs 100 and 200 described above. In other words, the case 320 used in the polymer battery pack 300 includes two long-sided parts 321a and 321b which have comparatively large areas and are separated to a predetermined distance from each other by two short-sided parts 322a and 322b which are connected to both sides of the long-sided parts 321a and 321b and have comparatively small areas and round shapes, and a bottom part which covers the long-sided parts 321a and 321b and the short-sided parts 322a and 322b. Through an upper side of the case 320, an opening 324 is formed, so that a core pack 310 can be easily combined into the case 320. A height of the case 320 is less than that of the core pack 310. Accordingly, after the core pack is combined into the case 320, a protection circuit member 317 which is connected to the core pack 310 and a neighboring area of the protection circuit member 317 protrude to a predetermined length through the case 320. The polymer battery pack 300 further includes a third pouch 312, a third printed circuit board 317a, third electronic parts 317b, a third electrode terminal 317c, and a third opening 341 to expose the third electrode terminal 317c.

Here, the two long-sided parts 321a and 321b and the short-sided part 322a are integrated into one body, and may be formed from one of steel, stainless steel, aluminum, plastic and the equivalents. One remaining short-sided part 322b of the case 320 and the bottom part 323 may be formed from resin. After the two long-sided parts 321a and 321b and the short-sided part 322a are formed, the remaining short-sided part 322b and the bottom part 323 are formed in a metal mold using resin to form the case 320.

As described above, since the short-sided parts 322a and 322b are formed in an approximately rounded shape, both sides of the resin 340 wrapping the protection circuit member 317 and an upper portion of the core pack 310 neighboring the protection circuit member 317 are formed in a substantially rounded form.

Moreover, as illustrated in FIG. 8C, the resin 340 is filled into spaces between the round-shaped short-sided parts 322a and 322b and a folded part 313 of a bare cell 311, respectively. Accordingly, a combining strength of the resin 340, the bare cell 311, and the case 320 is improved remarkably. Although the short-sided parts 322a and 322b are described as formed in a rounded shape, they are not limited thereto, that is, the short-sided parts 322a and 322b can be formed in polygonal shapes. As such the spaces between the short-sided parts 322a and 322b and the folded part 313 are filled with resin according to aspects of the present embodiment.

Figure 9A:
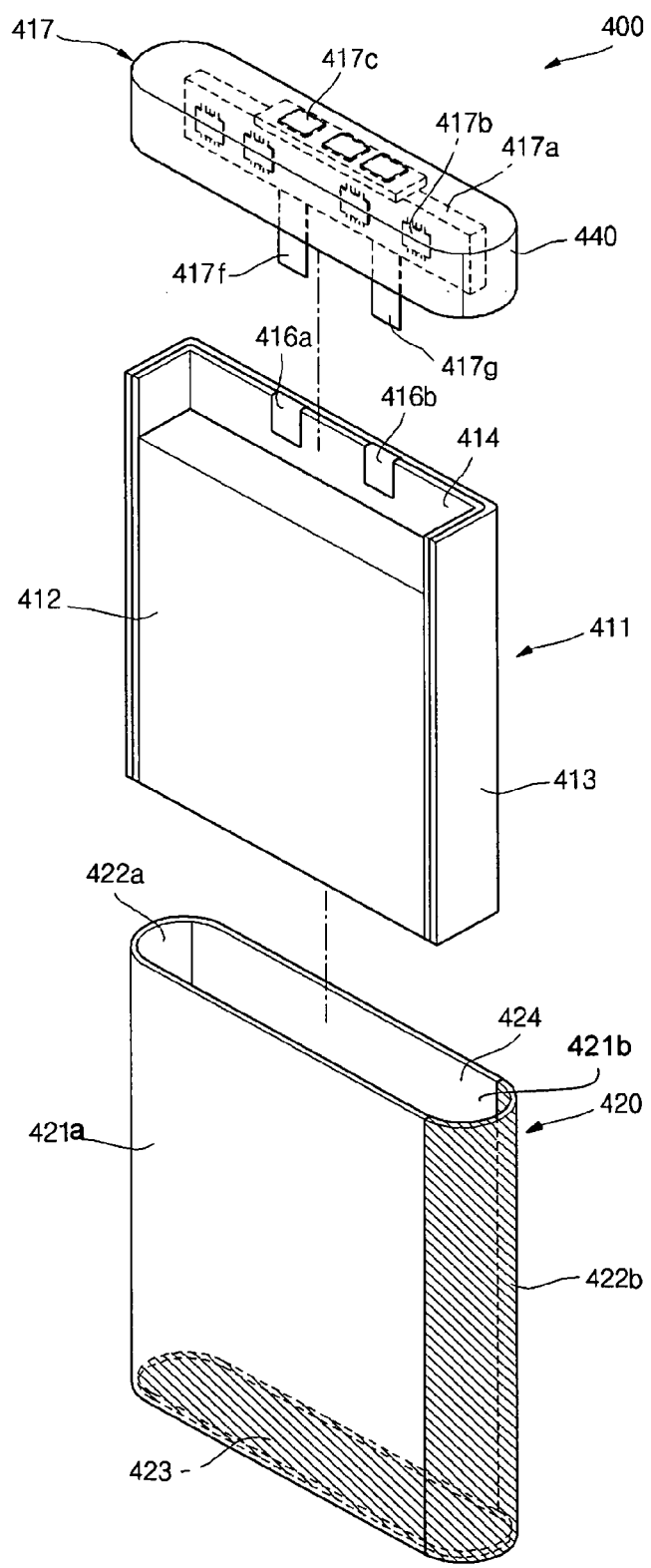
FIG. 9A is an exploded perspective view of a polymer battery pack according to another embodiment of the present invention.
Figure 9B:
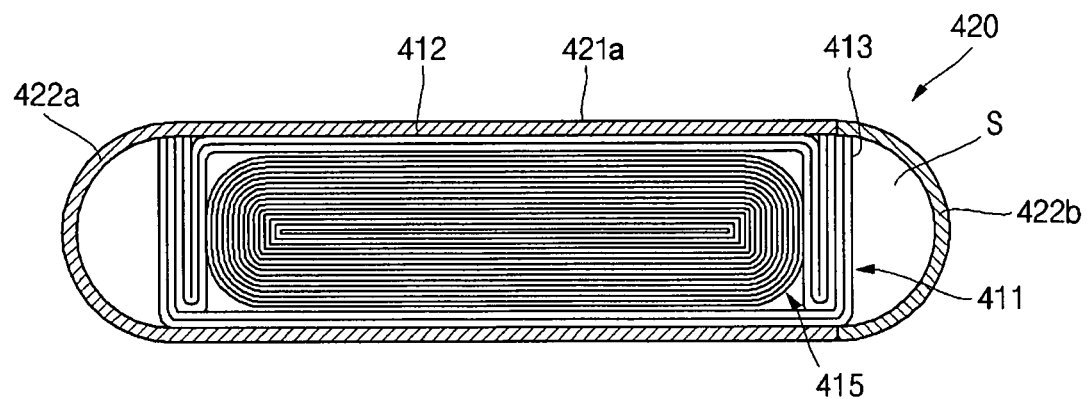
FIG. 9B is a sectional view of a connection of a bare cell and a case in FIG. 9A.

FIG. 9A is an exploded perspective view of a polymer battery pack according to another embodiment of the present invention, and FIG. 9B is a sectional view of a connection of a bare cell and a case according to the embodiment.

As illustrated in FIG. 9A, in the present embodiment, a protection circuit member 417 which has been molded with a resin 440 is combined into a case 420. In other words, components such as a printed circuit board 417a and an electronic part 417b constituting the protection circuit member 417 are molded with the resin 440 or an equivalent of the resin 440 in advance. At this time, other conductive electrode tabs 417f and 417g which are extended to a predetermined length outside the resin 440 are formed. The conductive electrode tabs 417f and 417g are electrically connected to conductive electrode tabs 416a and 416b formed on a bare cell 411. The polymer battery pack 400 further includes a fourth pouch 412, fourth folded parts 413, a fourth area 414, a fourth electrode assembly 415, and a fourth electrode terminal 417c.

A height of the bare cell 411 is a little less than that of the case 420. In other words, after the bare cell 411 is combined into the case 420, a predetermined region of the bare cell 411 is exposed through an opening of the case 424, but does not protrude. Accordingly, the polymer battery pack 400 is fully assembled by combining the bare cell 411 into the case 420 completely, electrically connecting conductive electrode tabs 417f and 417g to the conductive electrode tabs 416a and 416b, and combining the protection circuit member 417 with an upper space of the case 420.

Here, the case 420 includes two long-sided parts 421a and 421b which have comparatively large areas and are separated by a predetermined distance from each other by two short-sided parts 422a and 422b which are connected to both ends of the long-sided parts 421a and 421b, which have comparatively small areas and round shapes, and a bottom part 423 which covers the long-sided parts 421a and 421b and the short-sided parts 422a and 422b. Through an upper surface of the case 420, the opening 424 is formed, so that the bare cell 411 can be easily combined into the case 420.

Figure 15:
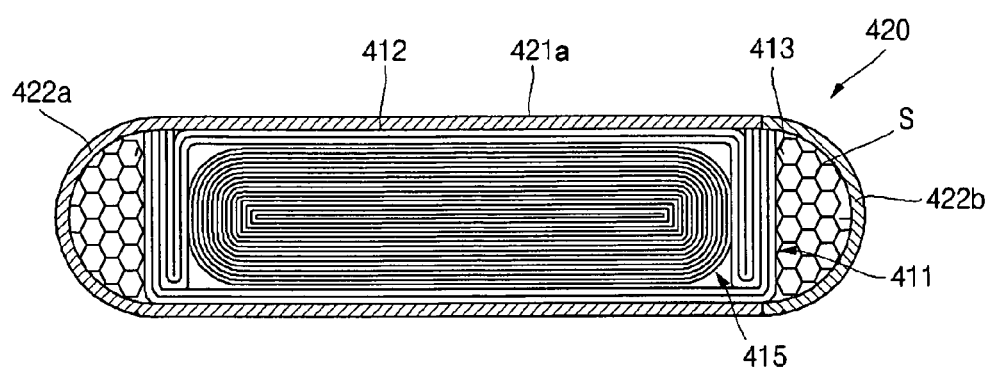
FIG. 15 is a sectional view of a connection of a bare cell and a case in FIG. 9A.

As illustrated in FIG. 9B, a predetermined space S may be formed between the short-sided parts 422a and 422b of the case 420, and a folded part 413 of the bare cell 411. The space S is formed, since the protection circuit member 417 which has been molded with the resin 440 is combined into the case 420. In other words, since no molding process is performed after combining the bare cell 411 and the protection circuit member 417 molded with the resin 420 into the case 420, the space S is formed. Although the short-sided parts 422a and 422b are described as round shapes, it is understood they could be polygonal shapes. Similarly, the space S, formed between the short-sided parts 422a and 422b can contain additional structural stiffeners to add strength to the polymer battery pack as shown in FIG. 15.

Figure 10:
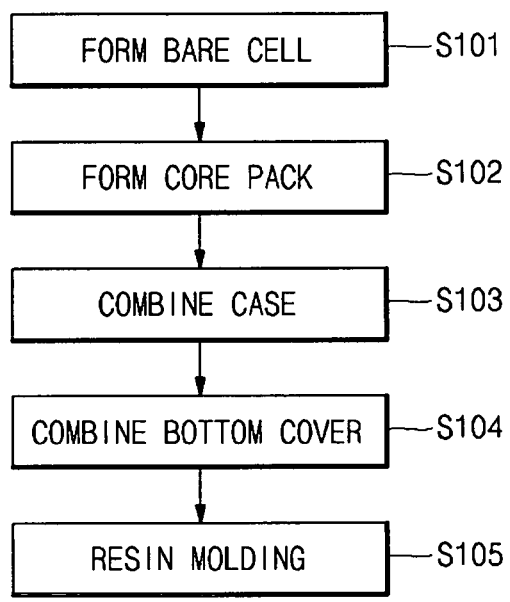
FIG. 10 is a flowchart of a method of manufacturing a polymer battery pack according to an embodiment of the present invention.

FIG. 10 is a flowchart of a method of manufacturing a polymer battery pack according to an embodiment of the present invention. Examples of the polymer battery pack produced by the method shown in FIG. 10 are shown in FIGS. 1 and 11G. The method of manufacturing the polymer battery pack according to this embodiment of the present invention includes a generation stage S101 of a bare cell, a forming stage S102 of a core pack, a combination stage S103 of a case, an attachment stage S104 of a bottom cover, and a molding stage S105 of a resin. In the generation stage S101 of the bare cell, an electrode assembly is inserted in a pouch, and the pouch is sealed (S101). In the forming stage S102 of the core pack, a protection circuit member including one or more electrode terminals is attached to an outer surface of the bare cell (S102). In the combination stage S103 of the case, the core pack is combined inside, and, more specifically, the core pack is combined into the case having a form of a tube or a sleeve, so that the protection circuit member and a bottom surface which is located in the opposite direction of the protection circuit member are exposed externally (S103). In the attachment stage S104 of the bottom cover, the bottom surface of the case is covered by the bottom cover (S104). In the molding stage S105 of a resin, the protection circuit member exposed through the case and a region of the bare cell on which the protection circuit member is seated are molded by a resin, so that an electrode terminal of the protection circuit member is exposed externally (S105).

Figure 11A:
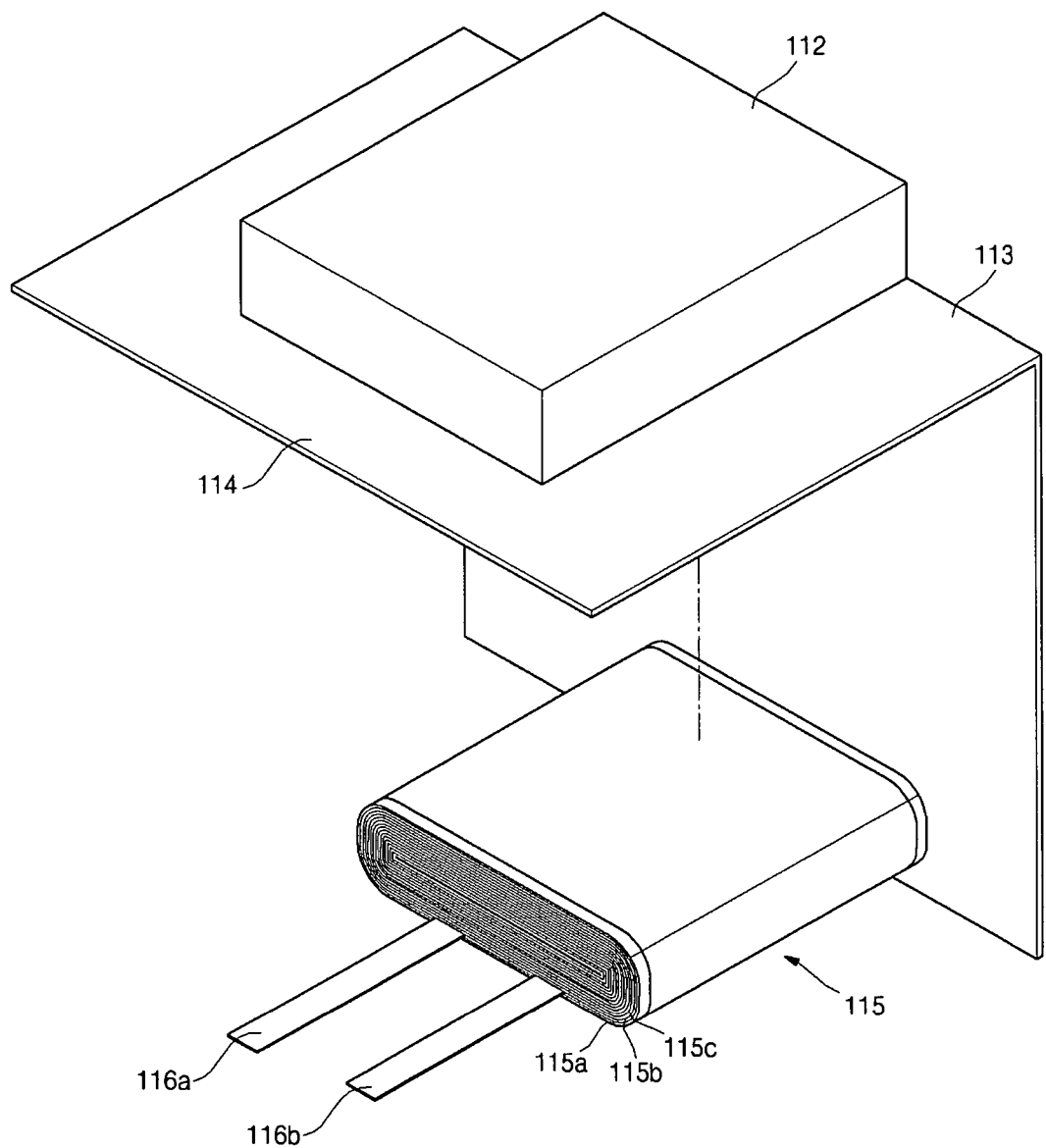
FIGS. 11A to 11G are diagrams of the method of manufacturing the polymer battery pack in FIG. 10 illustrating stages of the manufacturing method.
Figure 11B:
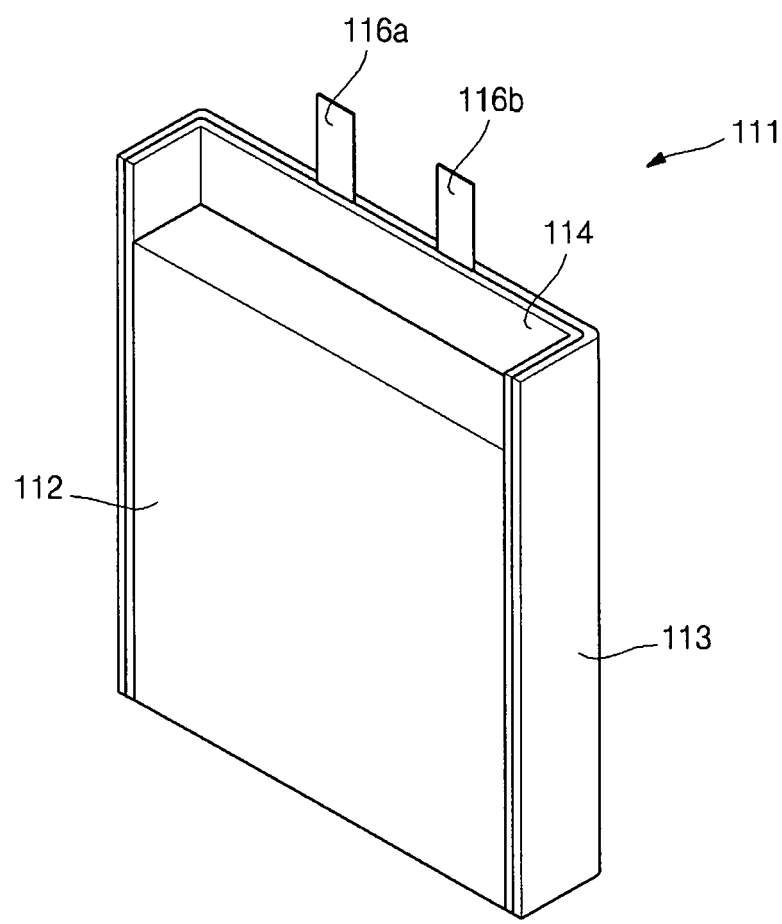
Figure 11C:
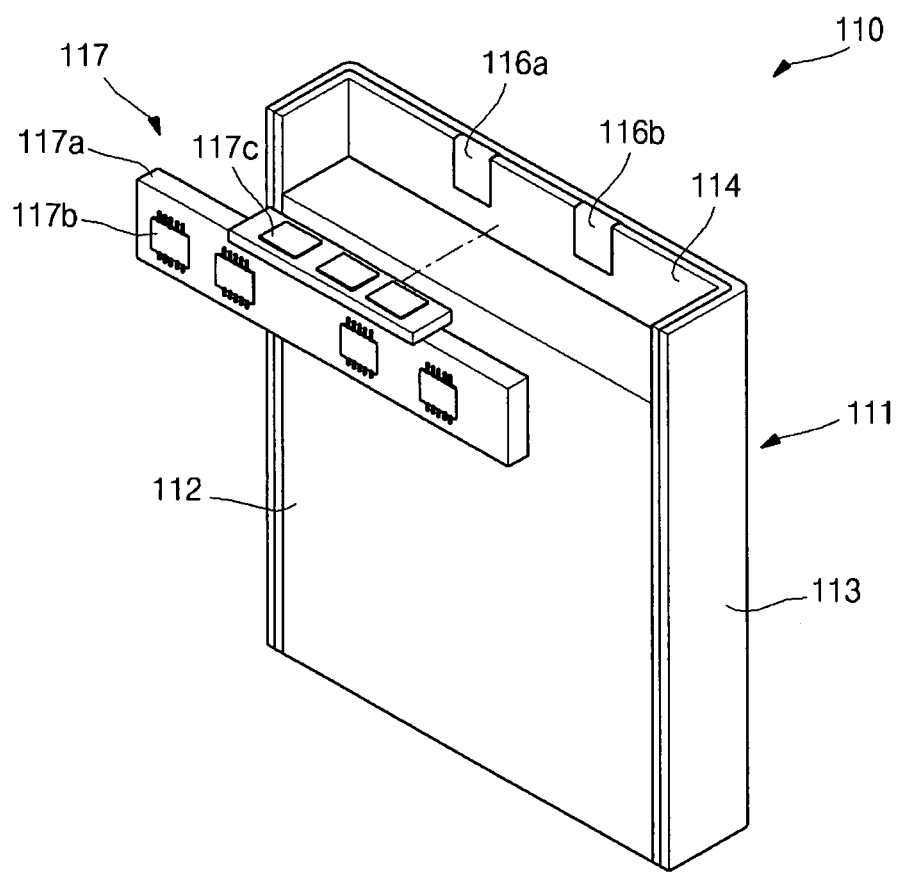
Figure 11D:
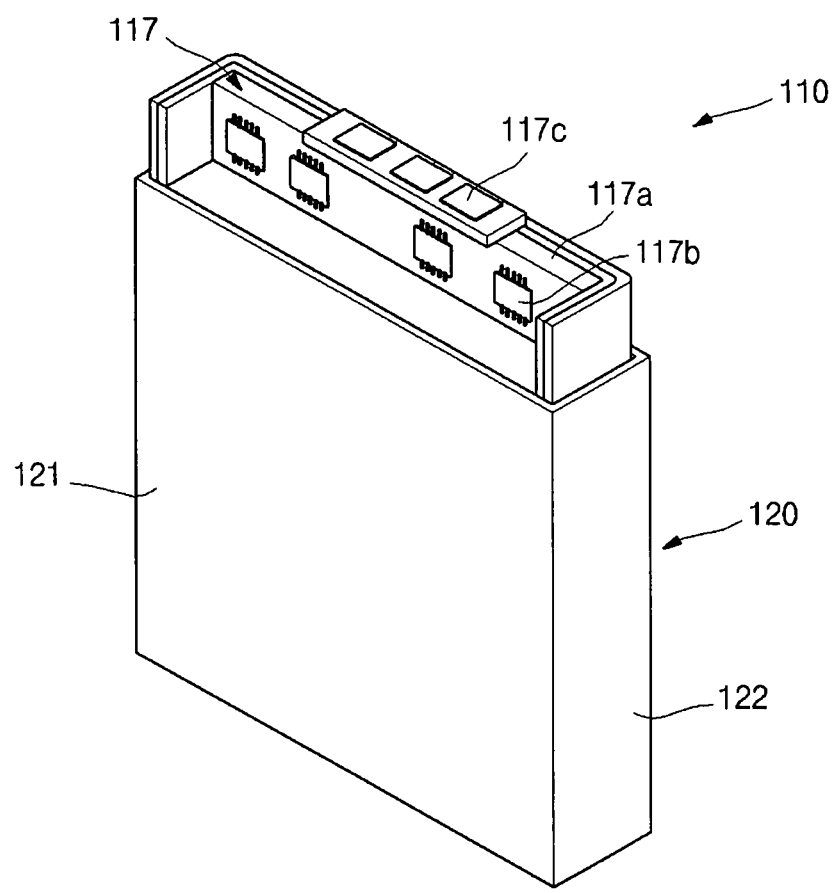
Figure 11E:
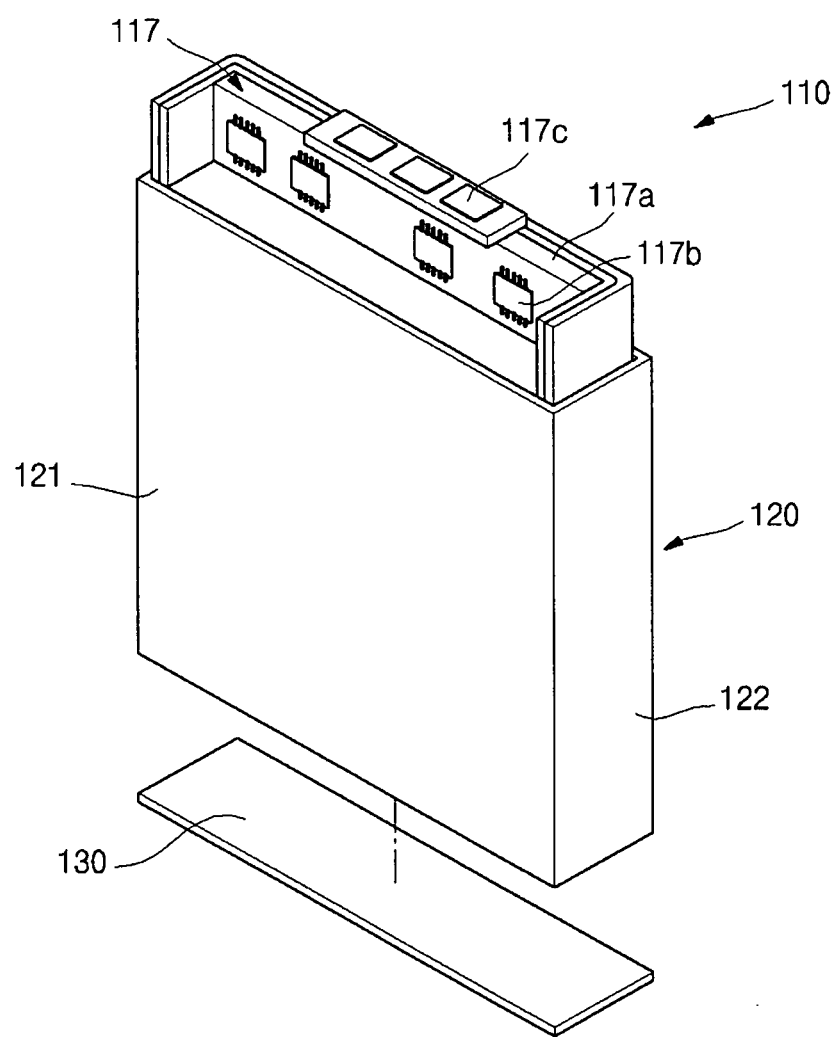
Figure 11F:
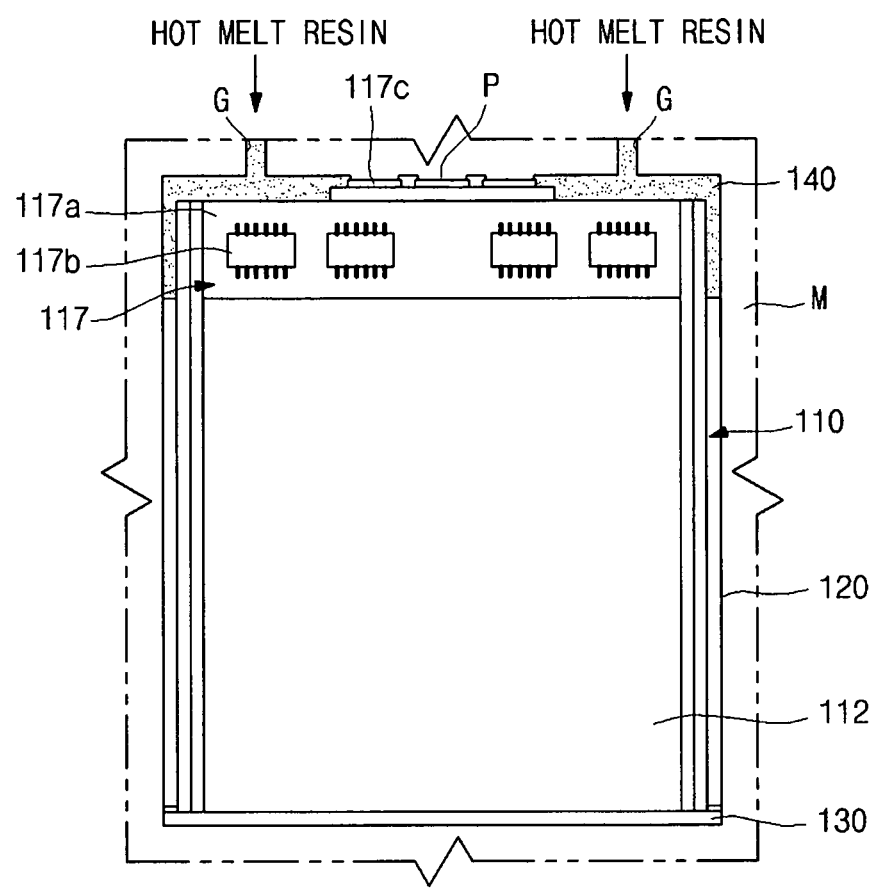
Figure 11G:
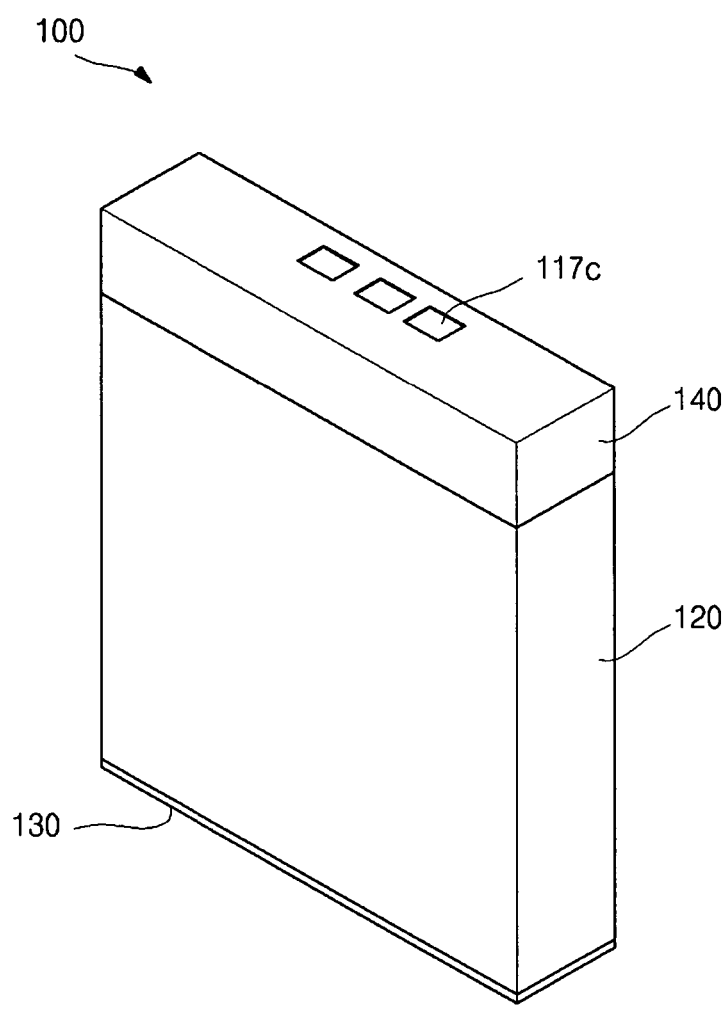

FIGS. 11A to 11G are diagrams of the method of manufacturing the polymer battery pack in FIG. 10 illustrating stages of the manufacturing method. Referring to FIGS. 11A and 11B, the forming stage S101 of the bare cell is illustrated.

In the forming stage S101 of the bare cell, a first electrode 115a, a separator 115b, and a second electrode 115c are wound, and an electrode assembly 115 in which first and second conductive electrode tabs 116a and 116b are connected to first and second electrodes 115a and 115c, respectively, is inserted into a pouch 112 and the pouch 112 is sealed. Here, the first and second conductive electrode tabs 116a and 116b are extended and exposed to a predetermined length outside the pouch 112. In addition, surfaces of the pouch 112 having the electrode assembly 115 in the center in three directions are heat-welded, so that the electrode assembly 115 is not detached outside. A surface in one direction which is not heat-welded is a portion in which the pouch 112 is folded and accordingly does not need to be heat-welded. After the heat-welding, both sides facing each other are bent to a predetermined angle to form a folded part 113 for minimizing a size of the pouch 112. An area neighboring a portion in which the first and second conductive electrode tabs 116a and 116b are externally exposed and extruded, is also a portion for heat-welding, and the region will be called a sealed upper region 114.

Referring to FIG. 11C, the forming stage S102 of the core pack is illustrated. In the forming stage S102 of the core pack 110, the protection circuit member 117 is connected to the bare cell 111 mechanically and electrically. In other words, the protection circuit member 117 including a printed circuit board 117a, an electronic component 117b, and an electrode terminal 117c is connected mechanically and electrically to the conductive electrode tabs 116a and 116b of the bare cell 111 exposed outside the pouch 112. At this time, the protection circuit member 117 is located in an area defined as the upper region 114 of the pouch 112 of the bare cell 111. A structure in which the protection circuit member 117 is seated on the bare cell 111 is called a core pack 110.

Referring to FIG. 11D, the combining stage S103 of the case is illustrated.

In the combining stage S103 of the case 120, the core pack 110 is combined into a case 120 which includes a long-sided part 121 and a short-sided part 122 and is open in directions upward and downward. Here, the case 120 is formed from polyamid, polyurethane, plastic, fiber-reinforced plastic, engineering plastic, aluminum, steel, stainless steel or the equivalent, and has a thickness of about 0.1 to 0.2 mm. A height of the case 120 is set to have approximately 80 to 95% of the height of the core pack 110, so that the protection circuit member 117 and a neighboring area of bare cell 111 on which the protection circuit member 117 is seated are exposed through the case 120. A bottom surface 110 of the core pack 110 is exposed externally through a lower part of the case 120.

Referring to FIG. 11E, the attachment stage S104 of the bottom cover is illustrated.

In the attachment stage S104 of the bottom cover 130, the bottom cover 130 is attached to a lower portion of the case 120. The bottom cover 130 may be attached to a lower portion of the long-sided and short-sided parts 121 and 122 of the case 120 by a conventional adhesive, welding, or the equivalent. However, a method of the attachment of the bottom cover 130 is not limited thereto.

The bottom cover 130 is formed from polyamid, polyurethane, plastic, fiber-reinforced plastic, engineering plastic, aluminum, steel, stainless steel or the equivalent for acquiring a strength, and the thickness of the bottom cover 130 is approximately 0.1 to 0.2 mm. In this method, all surfaces of the core pack 110 in side and downward directions except an upward direction are wrapped by the case 120 and the bottom cover 130.

Referring to FIG. 11F, the molding stage S105 of the resin is illustrated. Referring to FIG. 11G, the completed status of the polymer battery pack 100 is illustrated.

In the molding stage S105 of the resin, the core pack 110 wrapped by the case 120 and the bottom cover 130 as described above is seated on a predetermined metal mold M. There is no gap between the case 120 or the bottom cover 130 and the metal mold M, and a predetermined gap between the protection circuit member 117 or the portion of the core pack 110 neighboring the protection circuit member 117 and the metal mold M is formed. In addition, through the gap, a high-temperature and high-pressure resin 140 is filled through a gate G, and thereafter the resin 140 is cooled at a predetermined temperature and hardened. The electrode terminal 117c of the protection circuit member 117 is disposed to contact a protrusion P formed on a metal mold M, so that the electrode terminal 117c is exposed outside the resin 140. The resin 140 may be a hot-melt resin or the equivalent melting at a temperature of about 140 to 160° C. However, material of the resin 140 is not limited thereto. For example, an epoxy resin can be used that cures at room temperature. When the resin 140 is cooled down at a predetermined temperature after the resin has been filled, the polymer battery pack 100 is extracted from the metal mold M. Then, the polymer battery pack 100 in FIG. 11G is obtained. In other words, the method illustrated in the flow chart of FIG. 10 produces the polymer battery pack 100 in which most surfaces are wrapped by the high strength case 120 and the high strength bottom cover 130 such that only the electrode terminal 117c is exposed externally through the upper portion molded with the resin 140 as shown in FIG. 11G.

Figure 12:
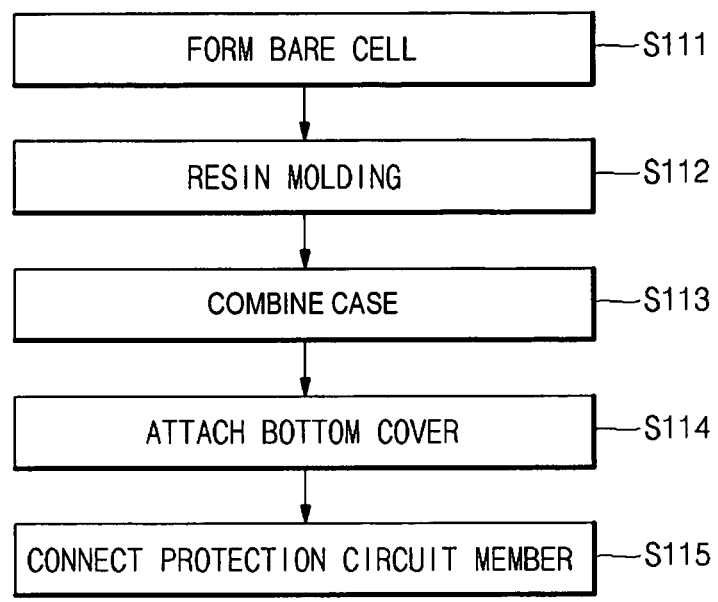
FIG. 12 is a flowchart of a manufacturing method of a polymer battery pack according to another embodiment of the present invention.

FIG. 12 is a flowchart of a manufacturing method of a polymer battery pack according to another embodiment of the present invention. This method illustrated in FIG. 12 produces, for example, the polymer battery pack shown in FIG. 6.

As illustrated in FIG. 12, in such an embodiment of the present invention, after the protection circuit member 217 is molded with the resin 240 in advance, remaining processes may be performed, instead of molding the protection circuit member 217 after the protection circuit member is electrically connected to the bare cell 111.

In other words, as illustrated in FIG. 12, the manufacturing method of the polymer battery pack 200 according to the present embodiment includes a forming stage S111 of a bare cell, a molding stage S112 of a core pack, a combination stage S113 of a case, a combination stage S114 of a bottom cover, and a connection stage S115 of a protection circuit member. In the forming stage S111 of the bare cell, an electrode assembly is inserted into a pouch and the pouch is sealed. In the molding stage S112 of the resin, a protection circuit member which has one or more electrode terminals is molded with a resin, so that the electrode terminals are exposed externally. In the combination stage S113 of the case, the bare cell is combined into the case, so that an area on which the protection circuit member in which the resin has been molded is seated and a bottom surface in an opposite direction are exposed outside the case (S113). In the attachment stage S114 of a bottom cover, the bottom cover is attached to cover the bottom surface of the core pack exposed through the case (S114). In the connection stage S115 of the protection circuit member, the resin-molded protection circuit member is seated and connected to a surface of the bare cell exposed through the case (S115).

When this manufacturing method described above is used, a height of the case 200 is the same as that of the bare cell 211. In other words, if a thickness of the bottom cover 230 which is attached to a lower portion of the case is disregarded, the bare cell 211 and the case 220 have the same height. Accordingly, when the bare cell 211 is combined into the case 220, some portion of the bare cell 211 is exposed externally through the case 220, but not extended outside the case 220.

As described above, after the bare cell 211 is inserted into the case 220, the protection circuit member 217 which has been molded with the resin 240 is electrically connected to the conductive electrode tabs 216a and 216b exposed externally through the bare cell 211 and combined in a space arranged in the case 220, concurrently. If this method is used, the completed polymer battery pack 200 has a form illustrated in FIGS. 6 and 7. Accordingly, most of the polymer battery pack 200 is wrapped by the case 220, the bottom cover 230, and the resin 240. Accordingly, strength and reliability of the polymer battery pack 200 is improved remarkably.

Figure 13:
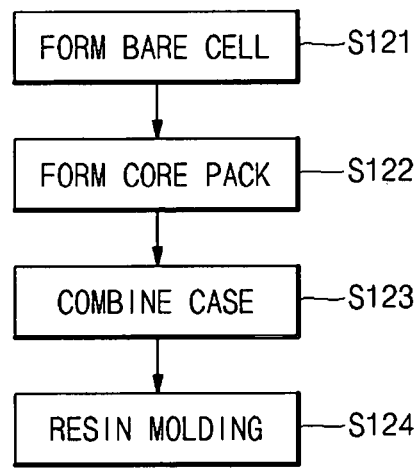
FIG. 13 is a flowchart of a manufacturing method of a polymer battery pack according to another embodiment of the present invention.

FIG. 13 is a flowchart of a manufacturing method of a polymer battery pack according to another embodiment of the present invention. Examples of the polymer battery pack produced according to this embodiment are shown in FIGS. 1 and 8A through 8C.

As illustrated in FIG. 13, the manufacturing method of the polymer battery pack 300 according to the embodiment includes a forming stage S121 of a bare cell, a forming stage of a core pack S122, a combination stage of a case S123, and a molding stage S124 of a resin. In the forming stage S121 of the bare cell, an electrode assembly is inserted into a pouch and the pouch is sealed (S121). In the forming stage S122 of the core pack, a protection circuit member having at least one electrode terminal is connected to an outer surface of the bare cell (S122). In the combination stage S123 of the case, the core pack is combined into the case, so that the protection circuit member is exposed outside the case (S123). In the molding stage S124 of the resin, the protection circuit member exposed through the case is molded with the resin, so that the electrode terminals of the protection circuit member are exposed externally.

Referring to FIGS. 8A to 8C again, the case 320 used in the combination stage S123 of the case includes long-sided parts 321a and 321b which have predetermined areas and are separated to a predetermined distance from each other by short-sided parts 322a and 322b which are connected to both ends of the long-sided parts 321a and 321b, which have smaller areas than the long-sided parts 321a and 321b, and have round shapes and a bottom part 323 which covers the long-sided parts 321a and 321b and the short-sided parts 322a and 322b at an area located in the opposite direction to the protection circuit member 317.

In the case 320, two long-sided parts 321a and 321b and at least one short-sided parts 322a may be formed from stainless steel and the bottom part 323 and the other short-sided part 322b may be formed from resin.

In the molding stage S124 of the resin, since a predetermined space is formed between the core pack 310 and the short-sided parts 322a and 322b, the resin 340 wrapping the protection circuit member 317 is filled in the space, simultaneously.

Figure 14:
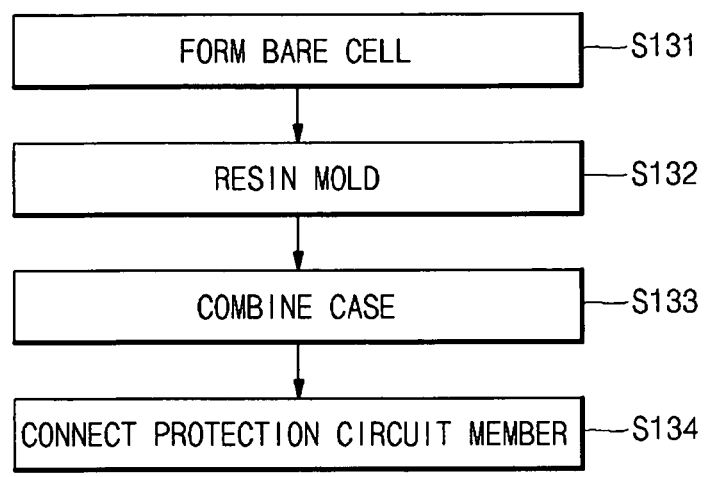
FIG. 14 is a flowchart of a manufacturing method of a polymer battery pack according to another embodiment of the present invention.

FIG. 14 is a flowchart of a manufacturing method of a polymer battery pack according to another embodiment of the present invention. This embodiment of the invention produces, for example, the polymer battery pack shown in FIGS. 9A and 9B.

As illustrated in FIG. 14, the manufacturing method of the polymer battery pack includes a generation stage S131 of a bare cell, a molding stage S132 of the resin, a combination stage S133 of a case, and a connection stage of a protection circuit member. In the generation stage S131 of the bare cell, an electrode assembly is inserted in a pouch and the pouch is sealed. In the molding stage S132 of the resin, a protection circuit member which has at least one electrode terminal is molded with the resin, so that the electrode terminal is exposed externally. In the combination stage S133 of the case, the bare cell is combined into the case so that an area on which the resin-molded protection circuit member is seated is exposed outside the case. In the connection stage S134 of the protection circuit member, the resin-molded protection circuit member is seated on and connected to a surface of the bare cell exposed through the case.

Referring to FIGS. 9A to 9B again, the case 420 used in the combination stage S133 of the case includes long-sided parts 421a and 421b which have a predetermined area and are separated to a predetermined distance from each other by short-sided parts 422a and 422b which are connected to both ends of the long-sided parts 421a and 421b, which have smaller areas than the areas of the long-sided parts 421a and 421b, and round shapes and a bottom part 423 which is commonly connected to the long-sided parts 421a and 421b and the short-sided parts 422a and 422b at an area located in the opposite direction to the protection circuit member 417.

In the case 420, two long-sided parts 421a and 421b facing each other and at least one short-sided part 422a may be formed from stainless steel and the bottom part 423 and the other short-sided part 422b may be formed from resin.

In the embodiment of the present invention, after the protection circuit member 417 is molded with the resin, in the connection stage S134 of the protection circuit member 417, the resin-molded protection circuit member 417 is electrically and mechanically connected to the bare cell 411 and mechanically connected to the case 420. Accordingly, the resin is not filled in between the short-sided parts 422a and 422b and a folded part 413 of the bare cell 411, so that a predetermined space S can be formed.

As described above, the polymer battery pack and the manufacturing method thereof according to an embodiment of the present invention, improves strength and reliability of the polymer battery pack by wrapping the bare cell which is in a form of a pouch and is weak with a case having a high strength.

In addition, according to an embodiment of the present invention, a thickness of the case can be reduced by 0.1 to 0.2 mm, so that capacity of the battery corresponding to the reduced space can be increased. In other words, while in a case of a conventional polymer battery pack, a space of approximately 0.8 mm, 0.4 mm per one side, is required for ultra-sonic welding, according to an embodiment of the present invention, the space for ultra-sonic welding is not required and accordingly, it is possible to include a bare cell or a core pack having a capacity of 850 mAh or more.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer battery pack comprising:
    a core pack formed by attaching a protection circuit member to a bare cell, the bare cell comprising a pouch forming a sealed upper region of the bare cell, and at least one electrode tab extending through the sealed upper region;
    a case to house the bare cell, the case having a first end; and
    a cap disposed at the first end of the case, formed of a resin that is filled and hardened into and directly contacts and surrounds both the protection circuit member and the sealed upper region of the bare cell, the cap having an opening through which an electrode terminal of the protection circuit member is exposed to an exterior of the cap,
    wherein the case comprises:
        two long-sided parts formed of stainless steel, separated by a predetermined distance from each other;
        a first short-sided part formed of stainless steel, connecting first ends of the long-sided parts with each other, and having an area smaller than an area of either of the long-sided parts;
        a second short-sided part formed of resin, connecting second ends of the long-sided parts with each other, and having an area smaller than the area of either of the long-sided parts; and
        a bottom part formed of resin, commonly connected to the long-sided parts, the first short-sided part, and the second short-sided part, located at a second end of the case that opposes the first end of the case,
        wherein the two long-sided parts and the first short-sided part are integrally formed, and the second short-sided part and the bottom part are integrally formed, and
    wherein the first end of the case is opened, so that the protection circuit member and the sealed upper region of the bare cell extend outside of the case.

2. The polymer battery pack of claim 1, wherein the bare cell further comprises:
    an electrode assembly having a first electrode, a separator, and a second electrode,
    wherein the at least one electrode tab comprises two electrode tabs connected to the first and second electrodes, respectively.

3. The polymer battery pack of claim 2, wherein the pouch comprises a first insulation layer, a metal layer, and a second insulation layer.

4. The polymer battery pack of claim 3, wherein:
    the first insulation layer is cast polypropylene (CPP);
    the metal layer is one selected from the group consisting of aluminum, steel, and stainless steel; and
    the second insulation layer is one selected from the group consisting of nylon and polyethylene terephthalate (PET).

5. The polymer battery pack of claim 1, wherein the protection circuit member comprises:
    a printed circuit board on which one or more electronic components and the electrode terminal are installed.

6. The polymer battery pack of claim 2, wherein the protection circuit member is electrically connected to the electrode tabs.

7. The polymer battery pack of claim 6, wherein the protection circuit member is mechanically connected to the electrode tabs.

8. The polymer battery pack of claim 6, wherein the electrode tabs are connected to conductive pads on the protection circuit member.

9. The polymer battery pack of claim 1, wherein the case is formed to have a thickness of 0.1 to 0.2 mm.

10. The polymer battery pack of claim 1, wherein the resin of the cap is a hot melt resin melting at a temperature of 140 to 160° C.

11. The polymer battery pack of claim 1, wherein the resin of the cap is an epoxy resin curing at room temperature.

12. The polymer battery pack of claim 1, wherein:
    the cap is formed by molding the resin around the protection circuit member and the sealed upper region of the bare cell; and
    the cap extends outward from the first end of the case.

13. The polymer battery pack of claim 1, wherein the cap is formed on the protection circuit member, so as to form a resin-molded protection circuit member, and the resin-molded protection circuit member is electrically connected to the core pack, by being combined with the case.

14. The polymer battery pack of claim 13, further comprising a waterproof seal between the resin-molded protection circuit member and the case.

15. The polymer battery pack of claim 1, wherein the first and second short-sided parts are rounded.

16. The polymer battery pack of claim 15, wherein both sides of the resin wrapping the protection circuit member and the sealed upper region of the bare cell are rounded.

17. The polymer battery pack of claim 1, wherein the first and second short-sided parts are polygonal.

18. The polymer battery pack of claim 1, wherein a space is formed between the pouch of the core pack and the first and second short-sided parts of the case.

19. The polymer battery pack of claim 18, wherein the space between the core pack and the first and second short-sided parts of the case is filled with a stiffener.

* * * * *